United States Patent

[11] 3,627,767

[72] Inventors Hermann Nachbur
Dornach;
Arthur Maeder, Therwil, both of Switzerland
[21] Appl. No. 889,310
[22] Filed Dec. 30, 1969
[45] Patented Dec. 14, 1971
[73] Assignee Ciba Limited
Basel, Switzerland
[32] Priority Jan. 7, 1969
[33] Switzerland
[31] 123

[54] CERTAIN ALKYLENE UREA- OR THIOUREA-CONTAINING PHOSPHORUS COMPOUNDS
10 Claims, No Drawings

[52] U.S. Cl.................................................. 260/256.5 R,
117/139.4, 260/251 R, 260/256.4 E, 260/309.7,
260/143, 106/15, 252/8.1
[51] Int. Cl..................................................... C07d 49/30,
C07d 51/18
[50] Field of Search........................................... 260/256.4
E, 309.7, 256.5 R

[56] References Cited
UNITED STATES PATENTS
2,951,008   8/1960   Debo.............................. 260/256.4 E Primary Examiner—Alex Mazel
Assistant Examiner—R. J. Gallagher
Attorneys—Harry Goldsmith, Joseph G. Kolodny and Mario A. Monaco ABSTRACT: Phosphorus compounds are provided which correspond to the formula

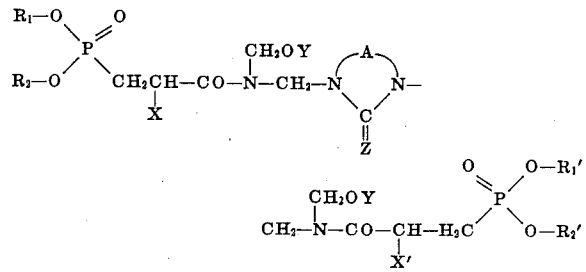

wherein each R is an alkyl, alkenyl or halogenalkyl radical, X and X' each is a methyl radical or a hydrogen atom, Y and Y' each is an alkyl radical or a hydrogen atom, A is an alkylene radical which is optionally substituted and Z is an oxygen or sulfur atom. The phosphorus compounds are manufactured from the corresponding phosphorus carboxylic acid amides; an alkylene area or thiourea and formaldehyde. These compounds optionally together with a curable amino-plast precondensate are useful for flameproofing and creaseproofing of cellulose-containing fibrous materials.

CERTAIN ALKYLENE UREA- OR THIOUREA-CONTAINING PHOSPHORUS COMPOUNDS

The subject of the invention are phosphorus compounds of formula (1)
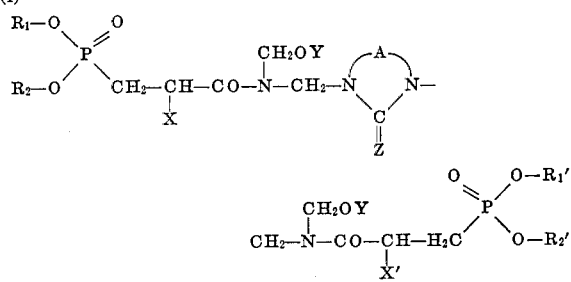

wherein $R_1$, $R_2$, $R'_1$ and $R'_2$ each represent an alkyl, alkenyl or halogenaklyl residue with at most four carbon atoms, X and X' each represent a methyl residue or preferably a hydrogen atom, A denotes an alkylene residue with two to three carbon atoms which is optionally substituted by lower alkyl, lower alkoxy or hydroxyl groups, Z denotes an oxygen or sulfur atom and Y denotes an alkyl residue with at most four carbon atoms or preferably hydrogen atom.

Particular interest attaches to symmetrical phosphorus compounds of formula (2)
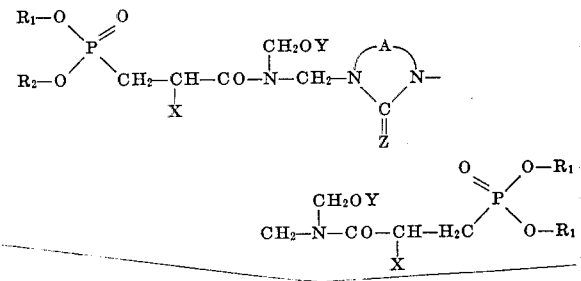

wherein $R_1$, X, Y, A and Z have the indicated significance.

Preferred phosphorus compounds correspond to the formula (3)
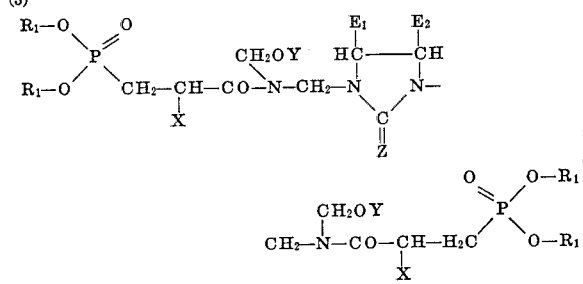

wherein $R_1$, X, Y and Z have the indicated significance and $E_1$ and $E_2$ each denote a methyl, methoxy or hydroxyl residue or a hydrogen atom, or of formula (4)
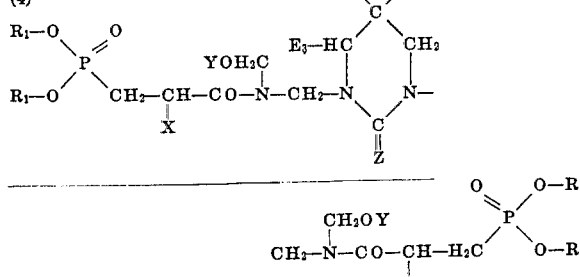

wherein $R_1$, X, Y and Z have the indicated significance, $E_3$ represents a hydrogen atom or a methoxy group, $E_4$ a hydrogen atom of a methyl group and $E_5$ a hydrogen atom or a methyl or hydroxyl group.

Amongst these compounds, the phosphorus compounds of formula (5)
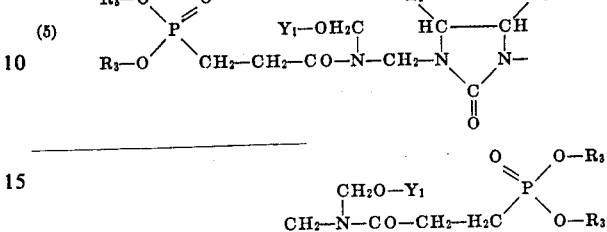

wherein $R_3$ denotes an ethyl residue or especially a methyl residue and $Y_1$ denotes a methyl residue or preferably a hydrogen atom, and $E_1$ and $E_2$ have the indicated significance, or of formula (6)
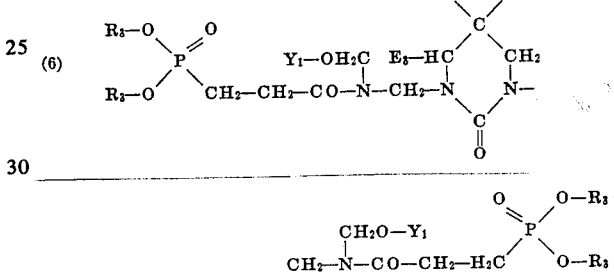

wherein $R_3$ denotes an ethyl residue or especially a methyl residue and $Y_1$ denotes a methyl residue or preferably a hydrogen atom, and $E_3$, $E_4$ and $E_5$ have the indicated significance, in turn enjoy special preference.

Compounds of formula (3) or (5) wherein $E_1$ and $E_2$ each represent a hydroxyl group or especially each represent a hydrogen atom are of particular interest, as are compounds of formulas (4) or (6) wherein $E_3$ denotes a hydrogen atom, $E_4$ a hydrogen atom and $E_5$ a hydroxyl group, or $E_4$ and $E_5$ each denotes a methyl group or especially each denote a hydrogen atom.

The phosphorus compounds of formulas (7)
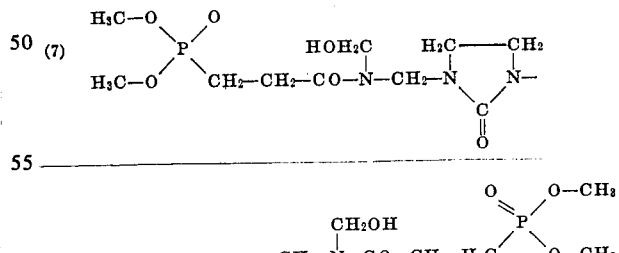

(8)
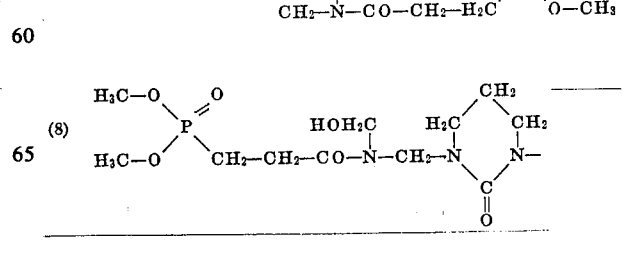

have proved particularly suitable.

The phosphorus compounds of formulas (1) to (8) are appropriately manufactured by reacting (a) 1 mol of a condensation product of (a') 2 mols of at least one compound of formulas (9) 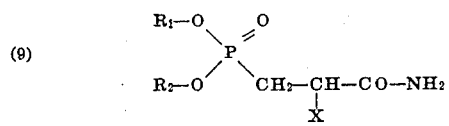

wherein $R_1$, $R_2$ and X have the indicated significance and (b') 1 mol of a compound of formula

(10) 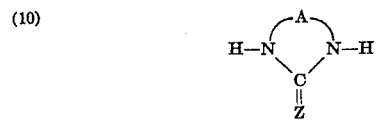

wherein A and Z have the indicated significance, and wherein the nitrogen atoms of the components (a') or (b') are methyloated and optionally etherified, with (b) 2 mols of formaldehyde or of a formaldehyde-releasing agent at elevated temperature, optionally in the presence of a basic catalyst and (c) optionally etherifying with 1 to 2 mols of an alkanol having at most four carbon atoms.

Possible alkanols for etherifying the condensation product (a) are especially alkanols with one to four carbon atoms, but preferably the condensation product (a) is used in an unetherified form.

Preferably, the procedure followed in this manufacture is that a)a') 2 mols of a compound of formula (9) are monomethylolated with 2 mols of formaldehyde or of a formaldehyde-releasing agent, and subsequently reacted (b') with 1 mol of a compound of formula (10) in the absence of water, in an inert, organic solvent, at elevated temperature, and that hereafter the resulting product is (b) methylolated with 2 to 3 mols of formaldehyde or of a formaldehyde-releasing agent and subsequently optionally further etherified with (c) 1 to 3 mols of an alkanol with at most four carbon atoms.

In addition it is also possible to manufacture the phosphorus compounds of formulas (1) to (8) according to another process by first a)b') methylolating 1 mol of a compound of formula (10) with formaldehyde or a formaldehyde-releasing agent at each of the two $H_2N$ groups and subsequently (a') reacting the product with 2 mols of a compound of formula (9) in the absence of water, in an inert organic solvent, at elevated temperature, and thereafter reacting the product as previously indicated with components (b) and optionally (c).

Schematically, the two reaction routes, with the first route being preferred, can for example be represented as follows:

Route 1

(a) (a') ... —CO—NH$_2$ + CH$_2$O   CH$_2$O + H$_2$N—CO— ...

↓

... —CO—NH—CH$_2$OH   HOCH$_2$—HN—CO— ...

etherify optionally

+

(b') 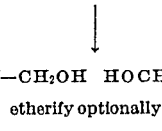

↓

(b) 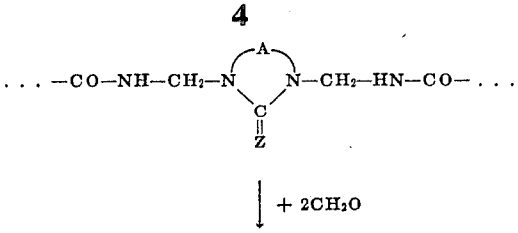

↓ + 2CH$_2$O

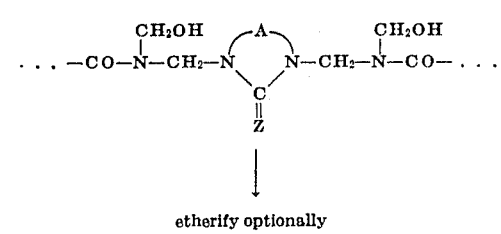

↓

(c) etherify optionally

Route 2

(a) (b')   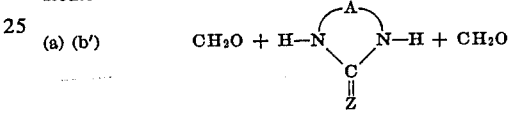

↓

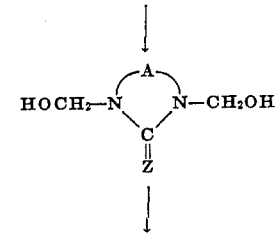

etherify optionally
+

(a')   ... —CO—NH$_2$     H$_2$N—CO— ...

↓

... —CO—NH—CH$_2$—N⟨A⟩N—CH$_2$—NH—CO— ...

↓ + 2CH$_2$O

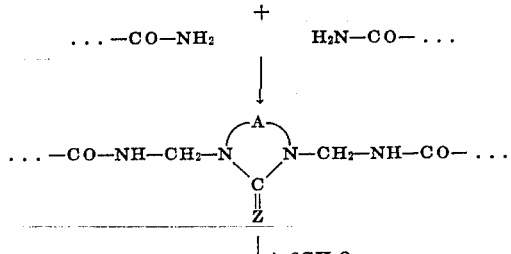

↓

(c) etherify optionally

Furthermore, the phosphorus compounds of formula (1) can also be manufactured in a single step by reacting the components (a'), (b') and (b) simultaneously with one another. Thereafter, an etherification can here again optionally still be carried out. Preferably the process is here, as in the methylolations of the multistage process, carried out in the presence of a basic catalyst.

Optionally, the methylol compound, or its ether, of the component (a') or of the component (b') can also be reacted in the presence of an acid catalyst, such as for example sulfuric acid, phosphoric acid or preferably p-toluenesulfonic acid, with the component (b') or the component (a') respectively. In In this reaction, the resulting water is appropriately distilled off azeotropically. As a rule, the reaction is allowed to take place at the boiling point of the organic solvent used, for example benzene, toluene or xylene, that is to say preferably at temperatures of 60° to 150° C.

The methylolations with formaldehyde or a formaldehyde-releasing agent, preferably paraformaldehyde, take place according to the known methods, preferably in the presence of a basic catalyst such as for example magnesium oxide, sodium hydroxide, potassium hydroxide or sodium methoxide, and at temperatures of 50° to 100° C. The methylolation of the condensation product (a) can be carried out in the presence of the organic solvent or only after its removal and can also be carried out with aqueous formaldehyde. The methylolation can however also be carried out in an acid medium.

Phosphonocarboxylic acid amides of formula

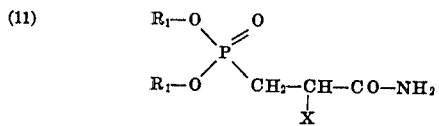

(11)

wherein $R_1$ and X have the indicated significance are preferably used for the manufacture of the compounds of formulas (1) to (6).

Phosphonocarboxylic acid amides of formula

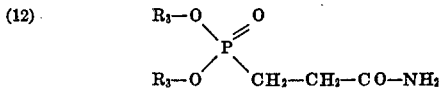

(12)

wherein $R_3$ has the indicated significance, such as for example 3-(dimethylphosphono)-propionic acid amide, are of particular interest.

Preferred starting products of formula (10) correspond to the formula

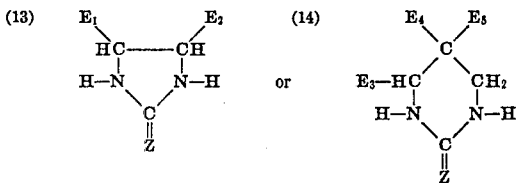

(13)    (14)

wherein the residues $E_1$ to $E_5$ and Z have the indicated significance.

Amongst these compounds, the compounds of formulas

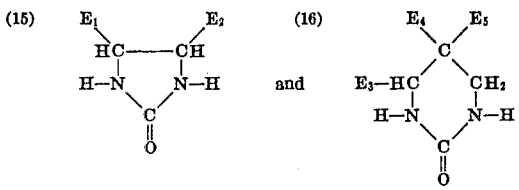

(15)    (16)

wherein the residues $E_1$ to $E_5$ have the indicated significance, are particularly suitable.

Ethyleneurea nd propyleneurea are here of particular interest. In addition, it is however also possible to use compounds which for example correspond to one of the following formulas:

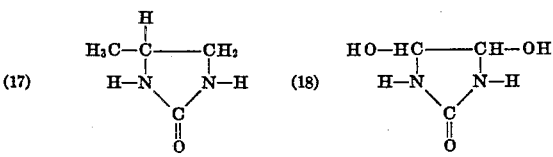

(17)    (18)

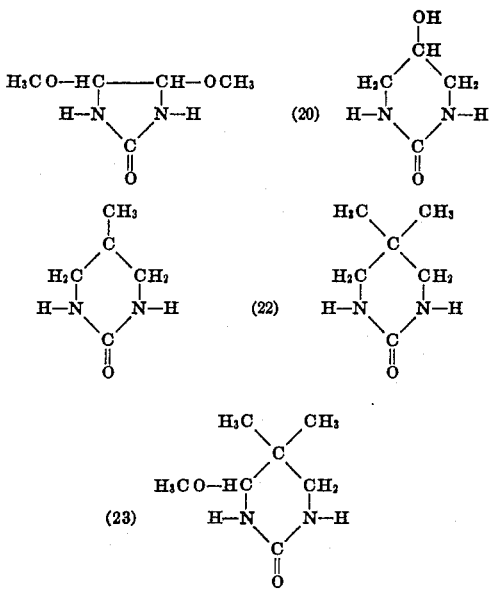

The invention also relates to a process for the flameproofing and creaseproofing of cellulose-containing fiber materials characterized in that an aqueous preparation which contains at least one phosphorus compound of one of the formulas (1) to (8) and optionally contains a curable aminoplastic precondensate is applied to these materials and that the materials are thereafter dried and subjected to a treatment at elevated temperature.

In particular, the phosphorus compounds of formula (1) are used for the flameproofing and creaseproofing of cellulose-containing textile materials. Phosphorous compounds of formulas (2) to (6) are preferred, and the process for flameproofing and creaseproofing is of very particular interest if compounds of formulas (7) and (8) are used.

The pH value of the aqueous preparations containing the compounds of formula (1) is advantageously less than 5, in particular less than 3. In order to achieve this, mineral acids such as sulfuric acid, nitric acid, hydrochloric acid or preferably orthophosphoric acid are added to the preparations. Instead of the acids themselves, especially hydrochloric acid, it is also possible to use compounds from which the corresponding acids are easily, for example even without warming, formed in water by hydrolysis. As examples, phosphorus trichloride, phosphorus pentachloride, phosphorus oxychloride, thionyl chloride, sulfuryl chloride, cyanuryl chloride, acetyl chloride and chloroacetyl chloride may here be mentioned. On hydrolysis, these compounds exclusively yield acid decomposition products, for example cyanuric acid and hydrochloric acid. Now it can be advantageous to use, instead of one of the strong acids mentioned, the acid mixtures corresponding to the hydrolysis products of one of the compounds just mentioned, that is to say for example to use, instead of hydrochloric acid or orthophosphoric acid alone, a mixture of hydrochloric acid and orthophosphoric acid, appropriately in the molecular ratio of 5:1, corresponding to the phosphorus pentachloride.

The preparations for flameproofing and creaseproofing can also contain a latent acid catalyst for accelerating the cure of the aminoplast precondensate which is optionally present and for cross linking the compounds of formula (1). As latent, acid catalysts it is possible to use the catalysts known for curing aminoplasts on cellulose-containing material, for example ammonium dihydrogen orthophosphate, magnesium chloride, zinc nitrate and especially ammonium chloride.

In addition to the compounds of formula (1) and the additives required for adjusting the pH value, the preparations to be used according to the invention can contain yet further substances. Water-soluble organic solvents such as alcohols, for example ethanol, have proved advantageous as solubilizing agents. An addition of aminoplast precondensates is advantageous for achieving a good wash-resistant flameproof finish but is not absolutely necessary.

By aminoplast precondensates there are understood addition products of formaldehyde to nitrogen compounds which can be methylolated. 1,3,5-Aminotriazines, such as N-substituted melamines, for example N-butylmelamine, N-trihalogenomethylmelamines, as well as ammeline, guanamines, for example benzoguanamine or acetoguanamine, or also diguanamines, may be mentioned. Further possibilities are also: alkylureas or arylureas and alkylthioureas or arylthioureas, alkyleneureas or alkylenediureas, for example ethyleneurea, propyleneurea and acetylenediurea, or especially 4,5-dihydroxyimidazolidone-2 and derivatives thereof, for example the 4,5-dihydroxyimidazolidone-2 which is substituted by the residue — $CH_2CH_2CO-NH-CH_2OH$ at the hydroxyl group in the 4-position. Methylol compounds of a urea, of an ethyleneurea or of melamine are preferentially used. Products which are as highly methylolated as possible in general yield particularly valuable products. Suitable aminoplast precondensates are both predominantly monomolecular aminoplastics and also more highly precondensed aminoplasts.

The ethers of these aminoplast precondensates can also be used together with the compounds of formula (3). The ethers of alkanols such as methanol, ethanol, n-propanol, isopropanol, n-butanol or pentanols are for example advantageous. It is however desirable for these aminoplast precondensates to be water-soluble such as for example pentamethylolaminedimethyl ether.

It can also be advantageous for the preparation to contain a copolymer, obtainable by polymerization in aqueous emulsion, of (a) 0.25 to 10 percent of an alkaline earth salt of an $\alpha,\beta$-ethylenically unsaturated monocarboxylic acid, (b) 0.25 to 30 percent of a N-methylolamide or N-methylolamide-ether of an $\alpha,\beta$-ethylenically unsaturated monocarboxylic or dicarboxylic acid and (c) 99.5 to 60 percent of at least one other copolymerizable compound. These copolymers and their manufacture are also known. The tear strength and abrasion resistance of the treated fiber material can be favorably influenced by the conjoint use of such a copolymer.

A plasticizing finish, for example an aqueous polyethylene emulsion or ethylene copolymer emulsion, should be mentioned as a further additive which is advantageous in some cases.

The content of the compound of formula (1) in the aqueous preparation is appropriately so chosen that 15 to 40 percent are applied to the material to be treated.

Here it is necessary to take into account that the commercially available textile materials of natural or regenerated cellulose can absorb between 50 and 120 percent of an aqueous preparation. As a rule the aqueous preparations contain 200 to 700 g./l., preferably 300 to 500 g./l., of phosphorus compound of formula (1).

The amount of the additive required to adjust the hydrogen ion concentration to a value of less than 5 depends on the selected value itself and on the nature of the additive, but in any case must not be less than a certain minimum. A certain excess over this minimum amount is generally to be recommended. Large excesses offer no advantages and can even prove harmful.

If a polymer of the indicated type is further added to the preparation, then this is advantageously done in small amounts, for example 1 to 10 percent relative to the amount of the compound of formula (1). The same is true of a plasticizer which may be used, where the appropriate amounts can again be 1 to 10 percent.

The preparations are now applied to the cellulose-containing fiber materials, for example linen, cotton, rayon, viscose staple, or fiber mixtures of such materials and others such as wool, polyamide or polyester fibers, and this can be carried out in a manner which is in itself known. Preferably, piece goods are used and impregnated on a padder of the customary construction, which is supplied with the preparation at room temperature. Particularly good flameproof effects are achieved on polyester-cotton, viscose rayon and especially on cotton.

The fiber material impregnated in this way now has to be dried and this is appropriately done at temperatures of up to 100° C. Thereafter it is subjected to a dry heat treatment at temperatures above 100° C., for example between 130° and 200° C., and preferably between 140° and 170° C., and the duration of this treatment can be the shorter, the higher is the temperature. This duration of heating is for example 2 to 6 minutes at temperatures of 140° to 170° C.

A rinse with an acid-binding agent, preferably with aqueous sodium carbonate solution, for example at between 40° C. and the boiling point and for 3 to 10 minutes is advisable in the case of a strongly acid reaction medium.

As already indicated, it is possible to obtain flameproof and creaseproof finishes according to the present process which largely remain preserved even after repeated washing or drycleaning and which do not cause any unacceptable lowering of the mechanical textile properties of the treated material.

A particular advantage of the present process is the fact that the treated cellulose-containing fiber materials are simultaneously flameproof and creaseproof even without the conjoint use of aminoplast precondensates. In particular, the wet-creasing properties of the treated fiber materials are significantly improved alongside the flameproof finish. A distinct improvement of the dry-creasing angle can also be observed.

The percentages and parts in the examples which follow are units by weight unless otherwise indicated. The relationship of parts by volume to parts by weight is as of ml. to g.

EXAMPLE 1

139 parts (0.5 mol) of 3-(bis-2-chlorethylphosphono)-propionic acid amide, 15.4 parts (0.5 mol) of 97.5 percent strength paraformaldehyde, 21.5 parts (0.25 mol) of ethyleneurea and 2 parts of sodium methylate powder are suspended in 200 parts of toluene in a 500 parts by volume stirred vessel equipped with a thermometer, reflux condenser and water separator, and treated for 1 hour at 100° C. internal temperature. Thereafter the mixture is raised to the reflux temperature of the toluene and water produced during the condensation is removed azeotropically and collected in the water separator. The theoretical amount of 9 parts of water is obtained within 3 hours. After this time the reaction is complete and no further water is obtained.

A third of this condensation product is freed of toluene in vacuo and the residue (73 parts) is dissolved in 350 parts of hot n-butanol, freed of insoluble constituents by filtration, and the filtrate freed of n-butanol in vacuo.

Residue: 58 parts of viscous syrup. This syrup is redissolved in 300 parts of symmetrical dichlorethane at 25° C. and the insoluble constituents are isolated by adding 5 parts of kieselguhr and again filtering. The clear filtrate is freed of the sym.-dichlorethane in vacuo at 40° C.

Residue: 54 parts of yellowish viscous syrup which according to examination by thin layer chromatography proves to be practically a single product.

The infrared spectrogram and mass spectrogram and the elementary analysis confirm the formula (24)

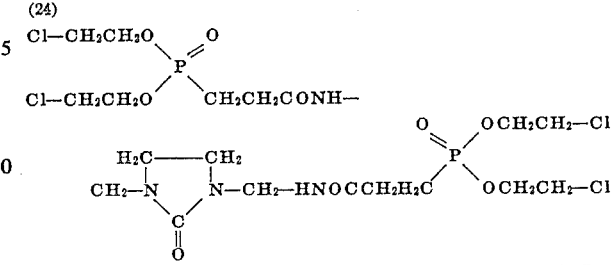

of the reaction product demonstrated by the analytical results.

The structure of the corresponding reaction products in examples 2 to 14 can also be determined in an analogous manner.

The unpurified remaining two-thirds of the reaction product containing toluene are mixed with 10.3 parts of 97.5 percent strength paraformaldehyde and 1 part of sodium methylate powder and methylolated for 1 hour at 100° C. Thereafter the mixture is cooled and diluted with 135 parts of methanol, a small amount of insoluble constituents is filtered off, and the methanol and toluene are removed at 50° C. in vacuo.

117 parts of a yellow clear syrup which is soluble in water-methanol (9:1) to give a clear solution and which contains practically 100 percent of active substance are obtained. On the basis of the determined formaldehyde content, the material is essentially a compound of formula

(25)
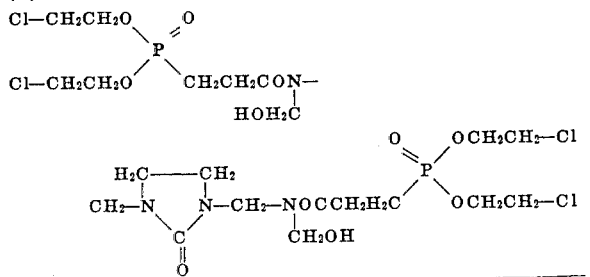

The reaction product still contains some monomethylol compound and nonmethylolated compound as an impurity, and this is also the case for the reaction products of example 2 to 14.

EXAMPLE 2

188 parts (2 mols) of ethyleneurea (91.5 percent ) in 800 parts of benzene are brought to the boil under reflux, with rapid stirring, in a 2,500 parts by volume stirred flask equipped with a water separator and thermometer, and are in the first instance dehydrated. 16 parts of water are obtained. Thereafter 880 parts (4 mols) of 3-[dimethylphosphono]-methylolpropionic acid amide and 5 parts of p-toluenesulfonic acid monohydrate are added and the mixture is allowed to react at the reflux temperature. In the course thereof, a total of 74 parts of water of condensation are produced in 14 hours and are collected in the water separator. After this time no further water is formed. The benzene is distilled off in vacuo, the residue is cooled to 40° C, and 330 parts of aqueous formaldehyde solution (36.4 percent strength) are added. Thereafter the mixture is warmed to 60° C. and methylolated for 3 hours at a pH value of 8.5 to 9. The pH value is kept constant by successive addition of a total of 17 parts of 40 percent strength sodium hydroxide solution. After cooling, 1,360 parts of a clear, colorless product of low viscosity are obtained which essentially corresponds to formula (7) and has a solids content of 82 percent.

EXAMPLE 3

660 parts (3 mols) of 96 percent strength 3-[dimethylphosphono]e-methylolpropionic acid amide, 150 parts (1.5 mols) of propyleneurea and 4 parts of p-toluenesulfonic acid monohydrate in 500 parts of benzene are brought to refluxing, with rapid stirring, in a 2,000 parts by volume stirred flask equipped with a water separator and thermometer. A total of 47 parts of water of condensation are thus formed over the course of 24 hours and collected in the water separator. After this time no further water is formed. The benzene is distilled off as far as possible and the residue cooled to 50° C. Thereafter 247 parts of aqueous formaldehyde solution (36.4 percent strength) are added and methylolation carried out for 3 hours at 60° C. and a pH value of 8.5 to 9. The pH value is kept constant by successive addition of a total of 10 parts of 40 percent strength sodium hydroxide solution. After cooling, 980 parts of a clear, colorless product of low viscosity are obtained, which essentially corresponds to the formula (8) and has a solids content of 71.7 percent.

EXAMPLE 4

211 parts of (3-dimethylphosphono)-methylolpropionic acid amide (1mol), 58 parts of hydroxypropyleneurea (0.5 mol) and 1.5 parts of p-toluenesulfonic acid monohydrate are suspended in 200 parts of toluene in a stirred vessel of capacity 500 parts by volume and equipped with a thermometer, reflux condenser and water separator, and are condensed at the reflux temperature of the toluene. The resulting water is removed azeotropically and collected in the water separator. The reaction is complete after 5 hours and the theoretically calculated amount of water (18 parts) is obtained. After cooling to 60° C., 82.4 parts of a 36.4 percent strength aqueous formaldehyde solution (1 mol) are added and the toluene which has separated out on the surface of the resulting aqueous solution is sucked off. Instead of the water separator, a pH electrode is now introduced into the apparatus. Methylolation is then carried out for 4 hours at 60° C., with the pH being kept at 8.5 to 9 by the gradual addition of a total of 14 parts of 30 percent strength sodium hydroxide solution. Thereafter the residual toluene is removed in vacuo and the mixture is filtered at room temperature. 305 parts of a syrupy water-soluble product are obtained, which contains 90 percent of active substance and which, on the basis of the determined formaldehyde value, essentially corresponds to the formula

(26)
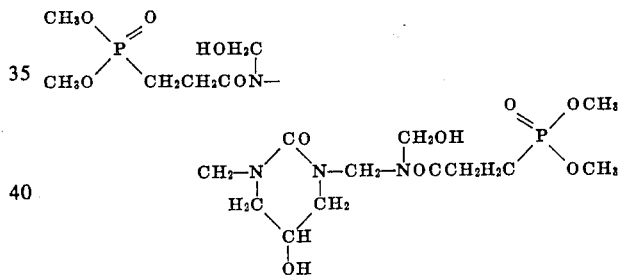

EXAMPLE 5

211 parts of (3-dimethylphosphono)-methylolpropionic acid amide, 59 parts of dihydroxyethyleneurea (0.5 mol) and 1.5 parts of p-toluenesulfonic acid monohydrate are suspended in 200 parts of benzene in the apparatus described in example 4, and condensed at the reflux temperature of the benzene. After 3.5 hours the reaction is complete and 17.5 parts of water are obtained. The mixture is cooled to 50° C. and the benzene removed in vacuo, 30.8 parts of 97.5 percent strength paraformaldehyde and 3.5 parts of sodium methylate powder are subsequently added, and methylolation is carried out for 2 hours at 100° C. After cooling, 287 parts of a very highly viscous water-soluble product are obtained which contains practically 100 percent active substance and which, on the basis of the determined formaldehyde value, essentially corresponds to the formula

(27)
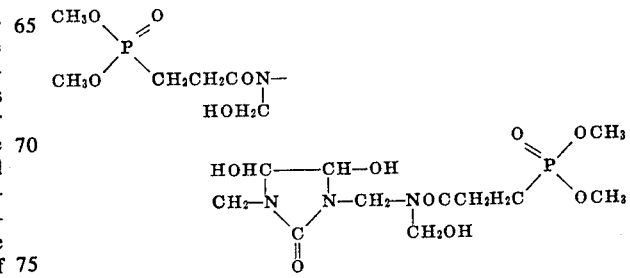

EXAMPLE 6

181 parts (1 mol) of 3-(dimethylphosphono)-propionic acid amide, 218 parts (0.5 mol) of 50 percent strength aqueous solution of a product of formula

(28)
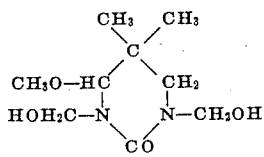

and 1.25 parts of p-toluenesulfonic acid monohydrate are suspended in 200 parts of benzene in the apparatus described in example 4 and are condensed at the reflux temperature of the benzene. 128 parts of water are obtained, of which 109 parts originate from the aqueous solution of the product of formula (28). Thus 17 parts of water have been obtained from the condensation reaction. Thereafter the mixture is cooled, diluted with 200 parts of methanol and filtered, and the benzene and methanol are removed in vacuo at 50° C. The condensation product still contains 4 parts of bonded formaldehyde. Yield: 287 parts.

The 287 parts of the condensation product obtained above are dissolved in 85 parts of a 35.3 percent strength aqueous formaldehyde solution (= 1 mol of $CH_2O$) in a stirred vessel of 500 parts by volume capacity, equipped with a thermometer and pH electrode, the solution is warmed to 60° C. and methylolation is carried out for 6 hours at this temperature, with the pH being kept at 8.5 to 9 by adding 4 parts of 30 percent strength sodium hydroxide solution. After cooling, 375 parts of a colorless clear solution of low viscosity are obtained, which has an active substance content of 83 percent and which on the basis of the determined formaldehyde value essentially corresponds to the following formula:

(29)
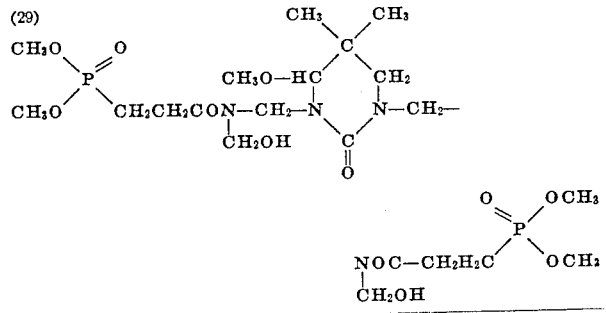

EXAMPLE 7

295 parts (1 mol) of 3-dibutylphosphono)-methylolpropionic acid amide and 43 parts (0.5 mol) of ethyleneurea are condensed, and the product post-methylolated with 30.8 parts of 97.5 percent strength paraformaldehyde, in an analogous manner to that described in example 5. A yellowish product of low viscosity is obtained, which is only sparingly soluble in water and shows an active substance content of practically 100 percent. The product essentially corresponds to the formula

(30)
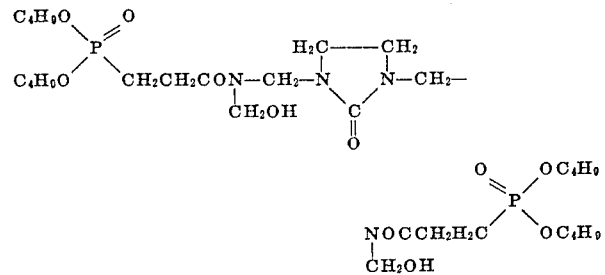

EXAMPLE 8

152.4 parts (0.58 mol) of 3-[diallylphono]-methylolpropionic acid amide, 29 parts (0.58 mol) of propyleneurea, 0.78 parts of p-toluenesulfonic acid monohydrate and 0.27 part of hydroquinone are suspended in 200 parts of toluene in the apparatus described in example 4 and are condensed at the reflux temperature of the toluene. 10.5 parts of water are obtained, corresponding to the theoretical amount of water. After cooling to 60° C., the mixture is diluted with 200 parts of methanol, traces of insoluble constituents are filtered off, and the toluene and methanol are removed in vacuo at 50° C. The syrupy condensation product is thereafter mixed with 17.8 parts (0.58 mol) of 97.5 percent strength paraformaldehyde and 1.8 parts of sodium methylate powder and methylolated for 2 hours at 100° C. After cooling, a highly viscous product is obtained which is water-soluble and shows an active substance content of practically 100 percent.

On the basis of the determined formaldehyde content, the reaction product essentially corresponds to the formula

(31)
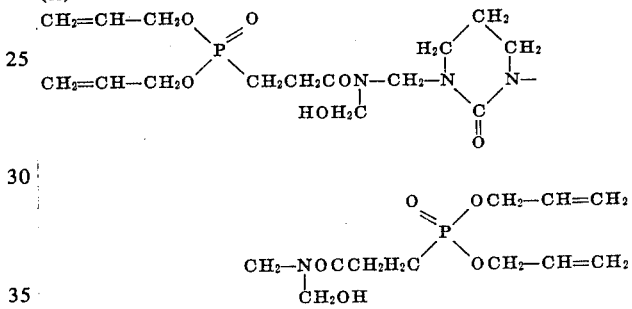

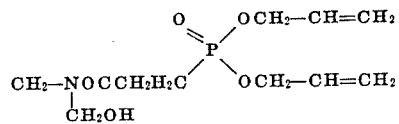

EXAMPLE 9

105.5 parts (0.5 mol) of 3-[dimethylphosphono]-methylolpropionic acid amide, 21.5 parts of ethyleneurea (0.25 mol) and 0.7 part of p-toluenesulfonic acid monohydrate are suspended in 200 parts of toluene in the apparatus described in example 4, and are condensed in the usual manner. After the calculated amount of water has been obtained, 15.4 parts (0.5 mol) of 97.5 percent strength paraformaldehyde and 1.5 parts of sodium methylate powder are added at 100° C. and the mixture is treated for 2 hours at 100° C. After cooling to room temperature, 200 parts of methanol are added to the methylol compound formed after first removing the toluene, and a solution is thereby produced. The water separator is replaced by a gas inlet tube and the pH is adjusted to 2.3–2.8 by means of HCl gas. The mixture is treated for 2 hours at 60° C. and the above pH, after which it is cooled and neutralized to pH 7.5 with solid sodium carbonate. Thereafter the solution is filtered and freed of methanol in vacuo at 40° C.

The residue is a yellowish syrup of low viscosity which shows an active substance content of practically 100 percent and gives a clear solution in water.

The compound essentially corresponds to the formula

(32)
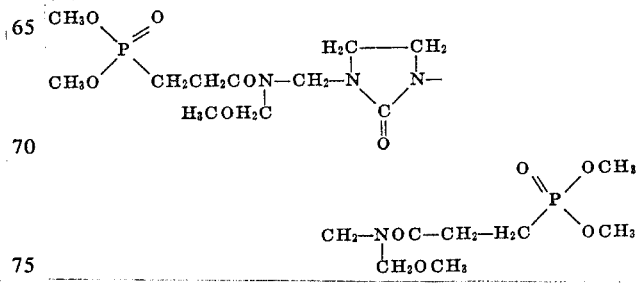

EXAMPLE 10

105.5 parts (0.5 mol) of 3-[dimethylphosphono]-methylolpropionic acid amide, 36.5 parts (0.25 mol) of dimethoxyethyleneurea and 0.7 part of p-toluenesulfonic acid monohydrate are suspended in 200 parts of toluene in the apparatus described in example 4, and condensed in the usual manner. About two-thirds of the calculated amount of water of condensation are obtained. After adding 15.4 parts (0.5 mol) of 97.5 percent strength paraformaldehyde and 1.5 parts of sodium methylate powder, methylolation is carried out for 1½hours at 100° C., after which the mixture is cooled and diluted with 200 parts of methanol. After filtering off traces of insoluble constituents, the methanol and toluene are removed in vacuo at 50° C. 136 parts of a solid product which after comminution is in the form of a powder and which is soluble in water are obtained. On the basis of the determined formaldehyde value, the compound is essentially the following:

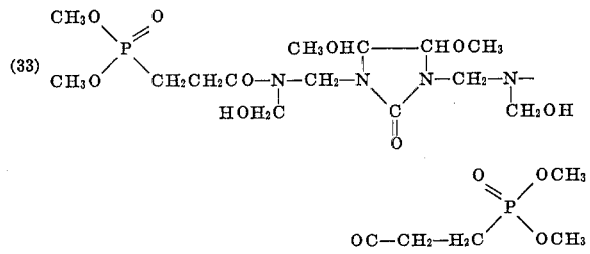

EXAMPLE 11

181 parts (1 mol) of 3[dimethylphosphono]-propionic acid amide, 51 parts (0.5 mol) of ethylenethiourea, 30.8 parts (1 mol) of 97.5 percent strength paraformaldehyde and 4 parts of sodium methylate powder are suspended in 200 parts of toluene in the apparatus described in example 4, and treated for 1 hour at 100° C. internal temperature. Thereafter the mixture is raised to the reflux temperature of the toluene and the water produced in the condensation is removed azeotropically and collected in the water separator. The theoretical amount of 18 parts of water is obtained within 3 hours. After this time the reaction is complete and no further water is produced.

The mixture is cooled to 100° C. and a further 30.8 parts (1 mol) of 97.5 percent strength paraformaldehyde and a further 3 parts of sodium methylate powder are added, and the whole is treated for 1½ hours at 100° C. It is then cooled and diluted with 200 parts of methanol, whereby a syrupy suspension which is difficult to filter is produced. After removing the methanol and toluene in vacuo at 50° C., a highly viscous opal-white product is obtained which is soluble in water, giving some clouding. The active substance content is practically 100 percent. On the basis of the determined formaldehyde content the compound is essentially the following:

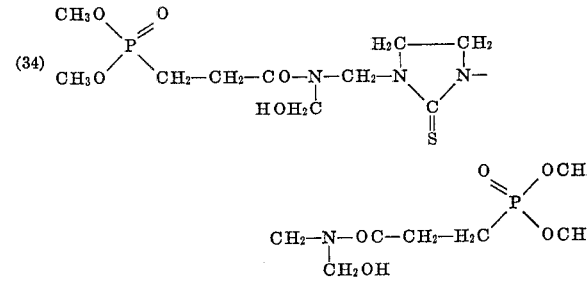

EXAMPLE 12

Example 9 is repeated except that the etherification reaction is carried out in the presence of 220 parts of n-butanol (instead of 200 parts of methanol).

The residue is a yellowish product of medium viscosity having an active substance content of practically 100 percent, which gives a clear solution in a mixture of 9 parts of water and 1 part of methanol.

The compound essentially corresponds to the formula:

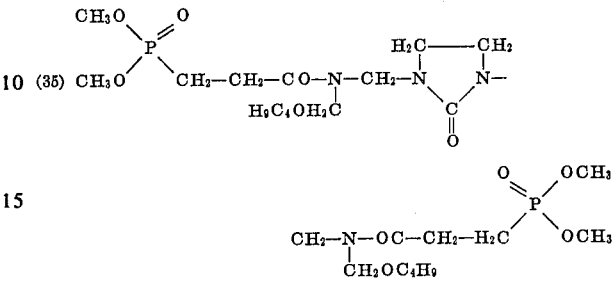

EXAMPLE 13

97.5 parts (0.5 mol) of 3-[dimethylphosphono]-2-methylpropionic acid amide, 21.5 parts (0.25 mol) of ethyleneurea, 15.4 parts (0.5 mol) of 97.5 percent strength paraformaldehyde and 2 parts of sodium methylate powder in 200 parts of toluene are reacted in the apparatus described in example 4, in an analogous manner to that described in example 11. The theoretical amount of water is obtained.

The methylolation is carried out with 15.4 parts (0.5 mol) of 97.5 percent strength paraformaldehyde and a further 1.5 parts of sodium methylate powder for 2 hours at 100° C., and after cooling the mixture is diluted with 300 parts of methanol. The resulting solution is freed of the insoluble constituents (21.5 parts of insoluble product, presumably polymeric constituents) by filtration and the toluene and methanol are removed in vacuo. A yellowish highly viscous product is obtained which is soluble in water and contains practically 100 percent of active substance. On the basis of the determined formaldehyde content, a compound of the following formula:

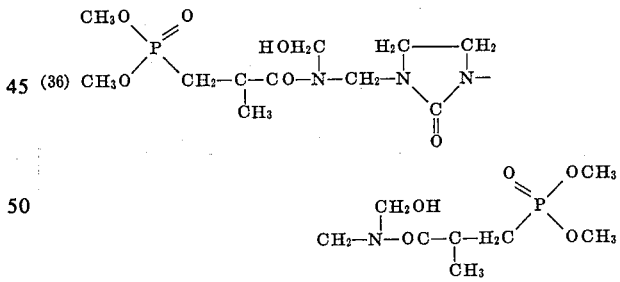

is essentially present.

EXAMPLE 14

45.25 (0.25 mol) parts of 3-[dimethylphosphono]-propionic acid amide, 48.75 (0.25 mol) parts of 3[dimethylphosphono]-2-methyl-propionic acid amide, 21.5 (0.25 mol) parts of ethyleneurea, 15.4 parts (0.5 mol) of 97.5 percent strength paraformaldehyde and 2 parts of sodium methylate powder in 200 parts of toluene are reacted in the apparatus described in example 4 in an analogous manner to that described in example 11. The theoretical amount of water is obtained.

The methylolation is carried out with 15.4 parts (0.5 mol) of 97.5 percent strength paraformaldehyde and a further 1.5 parts of sodium methylate powder for 2 hours at 100° C. and after cooling the mixture is diluted with 300 parts of methanol. The resulting solution is freed of the insoluble constituents (8 parts) by filtration and the toluene and methanol are removed in vacuo. A solid brittle product is obtained which after comminution is in the form of a powder and which gives a clear solution in water. On the basis of the determined formaldehyde content the following compound is essentially present:

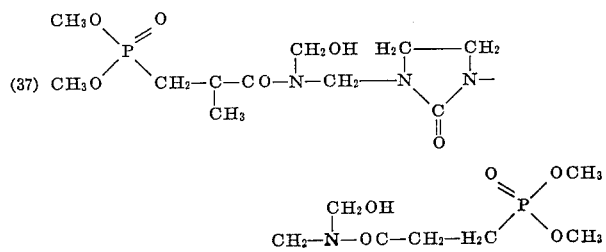

EXAMPLE 15

A cotton fabric is padded with one of the aqueous liquors A to D of table I below. The liquor uptake is 80 percent. The material is dried at 70° to 80° C. and is thereafter cured for 4½ minutes at 160° C. The fabric is now postwashed for 5 minutes at the boil in a solution containing 2 g. of anhydrous sodium carbonate per liter of water, rinsed and dried. A part of the fabric is boiled five times for 30 minutes in a solution which contains 2 g. of sodium carbonate and 5 g. of soap per liter of water (= 5 times SNV–4 wash).

The individual pieces of fabric are then tested for their flameproof property and crease resistance (vertical test according to DIN 53,906). The results of this test are also summarized in table I.

TABLE I

|  | Untreated | Treated with preparation— | | | |
|---|---|---|---|---|---|
|  |  | A | B | C | D |
| Constituents: |  |  |  |  |  |
| Product according to Example 2, g./l |  | 480 | 480 |  |  |
| Product according to Example 3, g./l |  |  |  | 520 | 520 |
| Pentamethylolmelamine-dimethyl ether (60%), g./l |  |  | 80 |  | 80 |
| Ethanol |  | 225 | 225 | 200 | 200 |
| NH$_4$Cl, g./l |  | 5 | 5 | 5 | 5 |
| Flameproof property: |  |  |  |  |  |
| After post-wash: |  |  |  |  |  |
| Burning time (seconds) | Burns | 0 | 0 | 0 | 0 |
| Glow time (seconds) |  | 0 | 0 | 0 | 0 |
| Tear length (cm.) |  | 10.5 | 9.5 | 10 | 9 |
| After 5 SNV–4 washes: |  |  |  |  |  |
| Burning time (seconds) | Burns | 0 | 0 | 0 | 0 |
| Glow time (seconds) |  | 0 | 0 | 0 | 0 |
| Tear length (cm.) |  | 10 | 9.5 | 13 | 9.5 |
| Crease resistance, creasing angle (mean of 10 tests): |  |  |  |  |  |
| Dry [≮°] |  | 69 | 95 |  | 79 |
| Wet [≮°] |  | 57 | 122 |  | 139 |

EXAMPLE 16

Cotton, viscose rayon and polyester-cotton fabrics are padded with one of the aqueous liquors E to K of table II below. The liquor uptake is 80 and 85 and 90 percent respectively. The material is dried at 70° to 80° C. and thereafter cured for 5 minutes at 145° C. The fabrics are now postwashed for 5 minutes at the boil (cotton) or at 60° C. (viscose rayon and polyester-cotton) in a solution which per liter contains 2 g. of anhydrous sodium carbonate, and are rinsed and dried. A part of the fabric is boiled (cotton) or washed at 60° C. (viscose rayon) 5 times for 30 minutes in a solution which contains 2 g. of sodium carbonate and 5 g. of soap per liter of water (= 5 SNV–4 washes and SNV–3 washes respectively).

The individual pieces of fabric are then tested for their flameproof property (vertical test according to DIN 53,906). The ignition times are:

cotton 6 seconds
viscose rayon 6 seconds
polyester-cotton 12 seconds

The results of this test are also summarized in table II.

EXAMPLE 17

A cotton fabric is padded with one of the aqueous liquors L to Q of table III below. The liquor uptake is 80 percent. The material is dried at 70° to 80° C. and thereafter cured for 5 minutes at 145° C. The fabrics are now postwashed for 5 minutes at the boil in a solution which per liter contains 2 g. of anhydrous sodium carbonate, rinsed and dried.

The individual pieces of fabric are then tested for their flameproof property (vertical test according to DIN 53,906, 6 seconds ignition time). The results of this test are summarized in table III.

EXAMPLE 18

A cotton fabric is padded with one of the aqueous liquors R to U of table IV below. The liquor uptake is 80 percent. The material is dried at 70° to 80° C. and thereafter cured for 5 minutes at 145° C.

The tests of the individual pieces of fabric (vertical test according to DIN 53,906) shows that a good flame-inhibiting effect is achieved with preparations R to U.

TABLE II

|  | Untreated | Treated with preparation— | | | | | | |
|---|---|---|---|---|---|---|---|---|
|  |  | E | F | G | H | I | J | K |
| Constituents (g./l.): |  |  |  |  |  |  |  |  |
| Product according to Example 2 |  | 400 |  |  |  |  |  |  |
| Product according to Example 4 |  |  | 390 |  |  |  |  |  |
| Product according to Example 5 |  |  |  | 430 |  | 390 |  |  |
| Product according to Example 6 |  |  |  |  | 460 |  | 400 |  |
| Product according to Example 8 |  |  |  |  |  |  |  | 430 |
| Pentamethylolmelamine-dimethyl ether (60%) |  |  | 80 |  |  | 80 | 80 | 80 |
| H$_3$PO$_4$ (85%) |  | 30 | 30 | 30 | 30 | 30 | 30 | 30 |
| Flameproof property: |  |  |  |  |  |  |  |  |
| Cotton: |  |  |  |  |  |  |  |  |
| After post-wash: |  |  |  |  |  |  |  |  |
| Burning time (sec.) | Burns | 0 | 0 | 0 |  | 0 | 0 | 0 |
| Tear length (cm.) |  | 10 | 9 | 9.5 |  | 9 | 9 | 9.5 |
| Plus after 5 SNV–4 washes: |  |  |  |  |  |  |  |  |
| Burning time (sec.) | Burns | 0 | 0 | 0 |  | 0 | 0 | 1 |
| Tear length (cm.) |  | 11 | 9.5 | 9 |  | 8.5 | 10 | 11 |
| Viscose rayon: |  |  |  |  |  |  |  |  |
| After post-wash: |  |  |  |  |  |  |  |  |
| Burning time (sec.) | Burns | 0 | 0 |  |  | 0 | 0 | 0 |
| Tear length (cm.) |  | 8.5 | 10.5 |  |  | 9 | 8.5 | 9.5 |
| Plus after 5 SNV–3 washes: |  |  |  |  |  |  |  |  |
| Burning time (sec.) |  |  |  |  |  | 1.5 | 0 | 0 |
| Tear length (cm.) |  |  |  |  |  | 10 | 9 | 8 |
| Polyester-cotton: |  |  |  |  |  |  |  |  |
| After post-wash: |  |  |  |  |  |  |  |  |
| Burning time (sec.) | Burns |  | 0 |  |  | 0 | 0 |  |
| Tear length (cm.) |  |  | 14 |  |  | 13.5 | 13.5 |  |

TABLE III

| | Untreated | Treated with preparation— | | | | | |
|---|---|---|---|---|---|---|---|
| | | L | M | N | O | P | Q |
| Constituents (g./l.): | | | | | | | |
| Product according to Example 1 | | 490 | | | | | |
| Product according to Example 4 | | | 435 | | | | |
| Product according to Example 9 | | | | 355 | | | |
| Product according to Example 10 | | | | | 355 | | |
| Product according to Example 12 | | | | | | 425 | |
| Product according to Example 13 | | | | | | | 385 |
| Pentamethylolmelamine-dimethyl ether (60% strength) | | 80 | | 80 | 80 | 80 | 80 |
| H₃PO₄ (85% strength) | | 30 | 30 | 30 | 30 | 30 | 30 |
| pH of the preparation | | 2.2 | 2.2 | 2.7 | 2.4 | 3.2 | 2.8 |
| Flameproof property, after post-wash: | | | | | | | |
| Burning time (sec.) | Burns | 0 | 0 | 0 | 0 | 0 | 0 |
| Tear length (cm.) | | 10.5 | 11.5 | 11 | 9.5 | 10 | 9 |

TABLE IV

| | Preparation | | | |
|---|---|---|---|---|
| | R | S | T | U |
| Constituents (g./l.): | | | | |
| Product according to Example 7 | 460 | | | |
| Product according to Example 11 | | 400 | 350 | |
| Product according to Example 14 | | | | 375 |
| Pentamethylolmelamine-dimethyl ether (60% strength) | 80 | | 80 | 80 |
| H₃PO₄ (85% strength) | 30 | 30 | 30 | 30 |
| pH of the preparation | 2.8 | 1.9 | 2.3 | 2.7 |

We claim:

1. A phosphorus compound of the formula

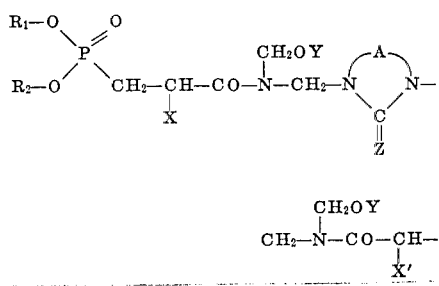

in which $R_1$, $R_2$, $R_1'$ and $R_2'$ each is an alkyl, alkenyl or halogenalkyl radical with at most four carbon atoms, X and X' each is a methyl group or a hydrogen atom, A is an alkylene radical with two to three carbon atoms or an alkylene radical with two to three carbon atoms substituted by one to three methyl, methoxy or hydroxyl groups, Z is an oxygen or sulfur atom and Y is an alkyl radical with at most four carbon atoms or a hydrogen atom.

2. A phosphorus compound according to claim 1 of the formula

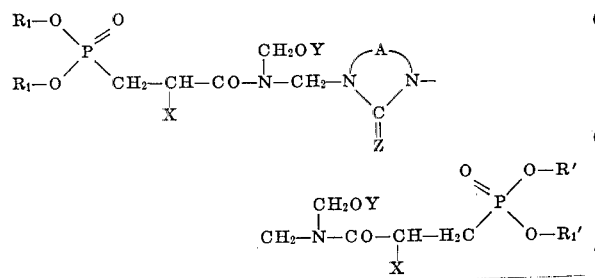

in which R', $R_1'$, X, Y, A and Z have the significance indicated in claim 1.

3. A phosphorus compound according to claim 1 of the formula

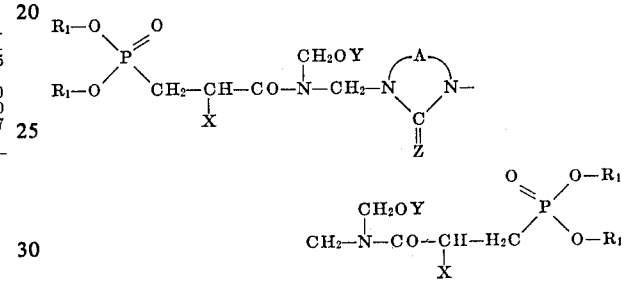

in which $R_1$, X, Y, A and Z have the significance indicated in claim 1.

4. A phosphorus compound according to claim 1 of the formula

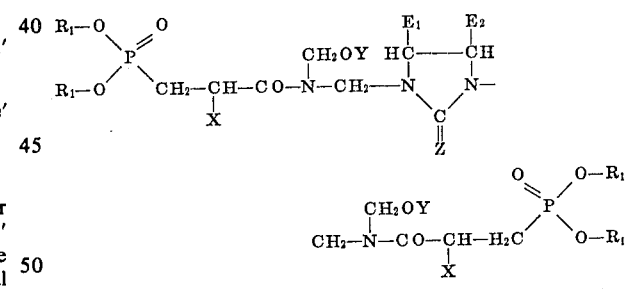

in which $R_1$, X, Y and Z have the significance indicated in claim 1 and $E_1$ and $E_2$ each is a methyl, methoxy or hydroxyl radical or a hydrogen atom.

5. A phosphorus compound according to claim 1 of the formula

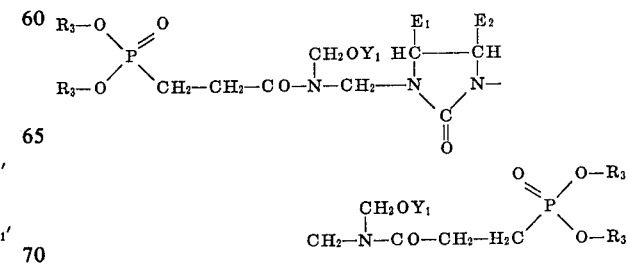

in which $R_3$ is a methyl or ethyl radical and $Y_1$ is a methyl radical or a hydrogen atom and $E_1$ and $E_2$ have the significance given in claim 3.

6. A phosphorus compound according to claim 1 of the formula

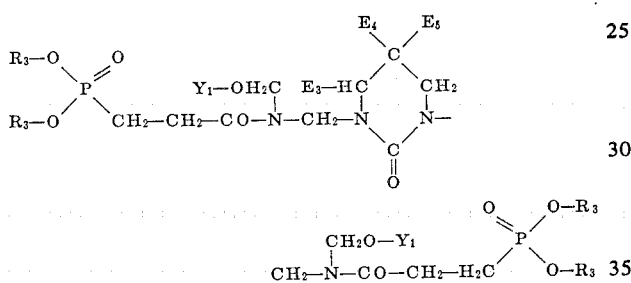

in which $R_1$, X, Y and Z have the significance indicated in claim 1, $E_3$ is a hydrogen atom or a methoxy group, $E_4$ is a hydrogen atom or a methyl group and $E_5$ is a hydrogen atom or a methyl or hydroxyl group.

7. A phosphorus compound according to claim 1 of the formula

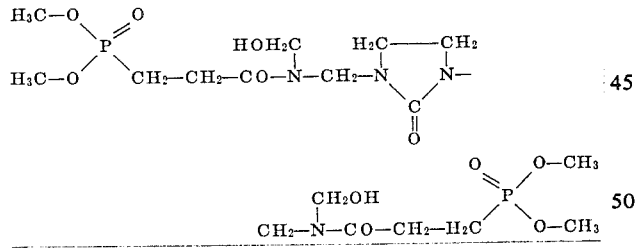

in which $R_3$, $Y_1$, $E_3$, $E_4$ and $E_5$ have the significance indicated in claims 5 and 6.

8. The phosphorus compound according to claim 1 of the formula

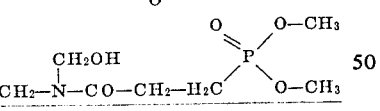

9. The phosphorus compound according to claim 1 of the formula

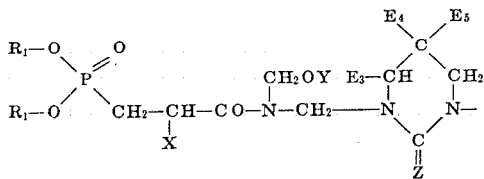

10. Process for the manufacture of phosphorus compounds of the composition indicated in claim 1, which comprises:

a. reacting 1 mol of a condensation product obtained by reacting 2 mols of at least one compound of formula

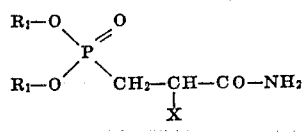

with 1 mol of a compound of formula

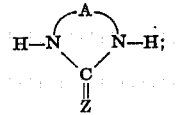

b. reacting said condensation product with 2 mols of formaldehyde or of a formaldehyde-releasing agent at elevated temperature to form a monomethylolated product; and c. when Y is alkyl, reacting said monomethylolated product from step (b) with 1 to 2 mols of an alkanol with at most four carbon atoms.

* * * * *